United States Patent
Gao et al.

(10) Patent No.: US 9,896,345 B2
(45) Date of Patent: *Feb. 20, 2018

(54) LITHIUM MANGANESE COMPOUNDS AND METHODS OF MAKING THE SAME

(71) Applicant: FMC Corporation, Philadelphia, PA (US)

(72) Inventors: Yuan Gao, Greenwood Village, CO (US); Marina Yakovleva, Gastonia, NC (US); Kenneth Brian Fitch, Cherryville, NC (US)

(73) Assignee: FMC CORPORATION, Philadelphia, PA (US)

( * ) Notice: Subject to any disclaimer, the term of this patent is extended or adjusted under 35 U.S.C. 154(b) by 380 days.

This patent is subject to a terminal disclaimer.

(21) Appl. No.: 14/086,289

(22) Filed: Nov. 21, 2013

(65) Prior Publication Data

US 2014/0077127 A1    Mar. 20, 2014

Related U.S. Application Data

(60) Continuation of application No. 12/831,420, filed on Jul. 7, 2010, now abandoned, which is a division of
(Continued)

(51) Int. Cl.
*C01D 15/02* (2006.01)
*C01G 45/12* (2006.01)
(Continued)

(52) U.S. Cl.
CPC ......... *C01D 15/02* (2013.01); *C01G 45/1228* (2013.01); *H01M 4/131* (2013.01);
(Continued)

(58) Field of Classification Search
CPC ...................................................... H01M 4/131
(Continued)

(56) References Cited

U.S. PATENT DOCUMENTS 3,271,196 A   9/1966 Oswin
3,508,967 A   4/1970 Lyall et al.
(Continued)

FOREIGN PATENT DOCUMENTS

DE   689 10 843       8/1989
DE   19532626 A1     3/1996
(Continued)

OTHER PUBLICATIONS

Rossen et al. "Structure and electrochemistry of $Li_xMn_{1-y}Ni_{1-y}O_2$", *Solid State Ionics* 57:311-318 (1992).
(Continued)

*Primary Examiner* — Sarah A Slifka
*Assistant Examiner* — Brent Thomas
(74) *Attorney, Agent, or Firm* — Williams Mullen; F. Michael Sajovec

(57) ABSTRACT

Electrode materials such as $Li_xMnO_2$ where $0.2<x\leq 2$ compounds for use with rechargeable lithium ion batteries can be formed by mixing $LiMn_2O_4$ compounds or manganese dioxide compounds with lithium metal or stabilized and non-stabilized lithium metal powders.

6 Claims, 5 Drawing Sheets

Related U.S. Application Data application No. 11/477,070, filed on Jun. 28, 2006, now Pat. No. 7,771,874.

(60) Provisional application No. 60/695,159, filed on Jun. 29, 2005.

(51) Int. Cl.
  *H01M 4/131* (2010.01)
  *H01M 4/1391* (2010.01)
  *H01M 4/505* (2010.01)
  *H01M 4/525* (2010.01)
  *H01M 10/052* (2010.01)

(52) U.S. Cl.
  CPC ......... *H01M 4/1391* (2013.01); *H01M 4/505* (2013.01); *H01M 4/525* (2013.01); *C01P 2002/54* (2013.01); *C01P 2002/72* (2013.01); *C01P 2006/40* (2013.01); *H01M 10/052* (2013.01)

(58) Field of Classification Search
  USPC ....................................................... 429/224
  See application file for complete search history.

(56) References Cited

U.S. PATENT DOCUMENTS

| | | |
|---|---|---|
| 4,615,959 A | 10/1986 | Hayashi et al. |
| 4,668,595 A | 5/1987 | Yoshino et al. |
| 5,028,500 A | 7/1991 | Fong et al. |
| 5,153,082 A | 10/1992 | Ogino et al. |
| 5,162,176 A | 11/1992 | Herr et al. |
| 5,286,582 A | 2/1994 | Tahara et al. |
| 5,312,611 A | 5/1994 | Takami et al. |
| 5,312,623 A | 5/1994 | Plichta et al. |
| 5,370,949 A | 12/1994 | Davidson et al. |
| 5,525,560 A * | 6/1996 | Yamazaki et al. ............ 501/103 |
| 5,543,021 A | 8/1996 | Yazami et al. |
| 5,587,256 A | 12/1996 | Wilson et al. |
| 5,601,796 A | 2/1997 | Frech et al. |
| 5,672,446 A | 9/1997 | Barker et al. |
| 5,707,756 A | 1/1998 | Inoue et al. |
| 5,725,968 A | 3/1998 | Sato et al. |
| 5,753,387 A | 5/1998 | Takami et al. |
| 5,753,388 A | 5/1998 | Koksbang et al. |
| 5,807,645 A | 9/1998 | Takeuchi et al. |
| 5,948,569 A | 9/1999 | Moses et al. |
| 5,951,919 A | 9/1999 | Hwang et al. |
| 5,958,622 A | 9/1999 | Kojima et al. |
| 6,156,457 A | 12/2000 | Takami et al. |
| 6,168,885 B1 | 1/2001 | Narang et al. |
| 6,183,911 B1 | 2/2001 | Kweon et al. |
| 6,265,110 B1 | 7/2001 | Rao et al. |
| 6,270,926 B1 | 8/2001 | Yamashita et al. |
| 6,387,564 B1 | 5/2002 | Yamashita et al. |
| 6,403,257 B1 * | 6/2002 | Christian et al. ............. 429/224 |
| 6,465,126 B1 | 10/2002 | Jannasch et al. |
| 6,541,156 B1 | 4/2003 | Fuse et al. |
| 6,706,447 B2 | 3/2004 | Gao et al. |
| 7,276,314 B2 | 10/2007 | Gao et al. |
| 7,771,874 B2 * | 8/2010 | Gao et al. ...................... 429/224 |
| 2002/0022183 A1 * | 2/2002 | Ogawa et al. ................. 429/224 |
| 2002/0119373 A1 * | 8/2002 | Gao et al. .................... 429/218.1 |
| 2004/0002005 A1 | 1/2004 | Gao et al. |
| 2004/0146784 A1 | 7/2004 | Gao et al. |
| 2005/0130043 A1 | 6/2005 | Gao et al. |

FOREIGN PATENT DOCUMENTS

| | | |
|---|---|---|
| EP | 0 328 131 | 8/1989 |
| EP | 0763865 A1 | 1/1992 |
| EP | 0573266 A1 | 6/1993 |
| EP | 0601832 A1 | 12/1993 |
| EP | 0696075 A2 | 8/1995 |
| EP | 0696075 A3 | 8/1995 |
| GB | 2383465 A | 6/2003 |
| JP | 63-13282 | 1/1988 |
| JP | 4-39859 | 2/1992 |
| JP | 4-126374 | 4/1992 |
| JP | 5-234621 | 9/1993 |
| JP | 10-117406 | 5/1998 |
| JP | 10-223259 | 8/1998 |
| JP | 10-270086 | 10/1998 |
| JP | 11-025975 | 1/1999 |
| JP | 2000-67853 | 3/2000 |
| JP | 2000143248 A | 5/2000 |
| JP | 2000164210 A | 6/2000 |
| JP | 2002505798 A | 2/2002 |
| JP | 2002373655 A | 12/2002 |
| JP | 2003007297 A | 10/2003 |
| JP | 2004-502629 | 1/2004 |
| WO | WO 97/26683 A1 | 7/1997 |
| WO | WO 00/13249 | 3/2000 |
| WO | WO 00/15557 A1 | 3/2000 |

OTHER PUBLICATIONS

Notification of Transmittal of the International Search Report and the Written Opinion of the International Searching Authority, or the Declaration, corresponding to International Application No. PCT/US2006/025694; mailed Mar. 29, 2007.
Kwon et al. "Characteristics of a lithium-polymer battery based on a lithium powder anode", *J. of Power Sources* 93:145-150 (2001).
U.S. Appl. No. 10/900,715, Gao et al., filed Jul. 28, 2004.
U.S. Appl. No. 10/324,611, Gao et al., filed Dec. 20, 2002.
Notification of Transmittal of the International Search Report and the Written Opinion of the International Searching Authority, or the Declaration, PCT/US2004/24502, Dec. 7, 2004.
Notice to Submit Response to the Examination Report corresponding to Korean Patent Application No. 10-2002-0023709 mailed Sep. 28, 2006.
European Search Report corresponding to Great Britain application No. GB 0209424.1; Date of Mailing: Jul. 11, 2002.
Search and Examination Report corresponding to Great Britain Application No. GB0703754.2 dated Jun. 22, 2007.
Huang et al. "Electrochemical characteristics of $Sn_{1-x}Si_xO_2$ as anode for lithium-ion batteries", *J. of Power Sources* 81-82;362-367 (1999).
"WordNet Search", WordNet. Mar. 20, 2008 http://wordnet.princeton.edu.
International Programme on Chemical Safety, n-Hexane Data Sheet 0279, Apr. 2000.
"Microencapsulation of Lithium", *U.S. Dept. of Commerce National Technical Information Service* (Dec. 31, 1985) 68 pages.
Supplementary Search and Examination Report corresponding to Great Britain Application No. 04779517 dated Feb. 20, 2009.
Chinese Office Action corresponding to Chinese Application No. 200680023854.5 issued Dec. 1, 2010.
Chinese Office Action corresponding to Chinese Application No. 200680023854.5 issued Sep. 2, 2011.
Canadian Office Action corresponding to Canadian Application No. 2,610,077 issued Jun. 7, 2012.
Japanese Office Action corresponding to Japanese Application No. 2008-519633 issued Mar. 30, 2012.
Korean Office Action corresponding to Korean Application No. 2007-7030597 issued Dec. 28, 2012.
Korean Office Action corresponding to Korean Application No. 2013-7004550 issued May 30, 2013.
Office Action corresponding to Canadian Application No. 2,840,566 dated Feb. 5, 2015.

\* cited by examiner

LITHIUM MANGANESE COMPOUNDS AND METHODS OF MAKING THE SAME

CROSS-REFERENCE TO RELATED APPLICATION

This application is a continuation application of U.S. patent application Ser. No. 12/831,420, filed on Jul. 7, 2010, currently pending, which is a divisional of U.S. patent application Ser. No. 11/477,070, filed Jun. 28, 2006, issued as U.S. Pat. No. 7,771,874 on Aug. 10, 2012, which claims priority to U.S. Provisional Application Ser. No. 60/695,159, filed Jun. 29, 2005, the disclosures of which are incorporated herein by reference in their entireties.

FIELD OF THE INVENTION

This invention generally relates to methods for forming lithium compounds, and the compounds formed by such methods. More particularly, this invention relates to methods for forming lithium manganese compounds and doped lithium manganese compounds by lithiation techniques.

BACKGROUND OF THE INVENTION

Attractive materials for use as cathode materials for lithium ion secondary batteries include $LiCoO_2$, $LiNiO_2$, and $LiMn_2O_4$. Unlike $LiCoO_2$ and $LiNiO_2$, the $LiMn_2O_4$ spinel compounds are believed to be overcharge safer and are desirable cathode materials for that reason. Nevertheless, although cycling over the full capacity range for pure $LiMn_2O_4$ can be done safely, the specific capacity of $LiMn_2O_4$ is low. Specifically, the theoretical capacity of $LiMn_2O_4$ is only 148 mA·hr/g and typically no more than about 115-120 mA·hr/g can be obtained with good cycleability. $LiMn_2O_4$ can contain excess lithium on the 16d manganese sites and can be written as $Li_{1+x}Mn_{2-x}O_4$ ($0 \leq x \leq 0.33$). Use of the formula $LiMn_2O_4$ herein is understood to denote $Li_{1+x}Mn_{2-x}O_4$ as well.

The orthorhombic $LiMnO_2$ and the tetragonally distorted spinel $Li_2Mn_2O_4$ have the potential for larger capacities than those obtained with the $LiMn_2O_4$ spinel. However, cycling over the full capacity range for $LiMnO_2$ and $Li_2Mn_2O_4$ results in a rapid capacity fade. Layered $LiMnO_2$ quickly converts to a spinel form upon cycling which also results in a capacity fade.

Various attempts have been made to either improve the specific capacity or safety of the lithium metal oxides used in secondary lithium batteries by doping these lithium metal oxides with other cations. For example, U.S. Pat. No. 6,214,493 to Bruce et al. relates to stabilized layered $LiMnO_2$ using cobalt (Co) as a dopant material. Stabilization has been recorded with as little as 15 percent cobalt substitution. In another example, U.S. Pat. No. 5,370,949 to Davidson et al. proposes that introducing chromium cations into $LiMnO_2$ can produce a tetragonally distorted spinel type of structure which is air stable and has good reversibility on cycling in lithium cells.

$Li_2MnO_2$ compounds have also been considered as electrode materials. U.S. Pat. No. 4,980,251 to Thackeray proposes that $Li_2MnO_2$ can be formed having a theoretical capacity of 530 mA·hr/g by reacting $LiMn_2O_4$ spinel compounds with n-BuLi as follows:

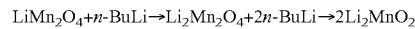
$LiMn_2O_4 + n\text{-BuLi} \rightarrow Li_2Mn_2O_4 + 2n\text{-BuLi} \rightarrow 2Li_2MnO_2$ The $Li_2MnO_2$ has a hexagonal close packed layered structure, similar to the structure of $LiCoO_2$, except that the $Li^+$ ions in $Li_2MnO_2$ occupy the tetrahedral sites instead of the octahedral sites as in $LiCoO_2$. However, the $Li_2MnO_2$ compounds formed according to Thackeray's methods are unstable. In particular, Thackeray notes that the layered structure of $Li_2MnO_2$ is unstable and that it converts back to the spinel framework upon delithiation. This is undesirable because repeated conversion between layered and spinel structures decreases capacity retention and results in voltage gaps.

A doped lithium manganese oxide preferably exhibits a high usable reversible capacity and good cycleability to maintain reversible capacity during cycling. $LiMn_2O_4$ can generally only be operated at 115-120 mA·hr/g with good cycleability. Furthermore, $Li_2MnO_2$ compounds are expensive to make and are unstable when made according to available methods. Therefore, there is a need to produce a lithium metal oxide that exhibits an improved reversible capacity and good cycleability while maintaining thermal stability.

SUMMARY OF THE INVENTION

Embodiments of the present invention include methods for making lithium manganese oxide compounds and doped lithium manganese oxide compounds. The lithium manganese compounds and doped lithium manganese oxide compounds formed according to embodiments of the present invention can be used to form electrodes and electrode materials for use in batteries, such as rechargeable lithium ion batteries.

According to some embodiments of the present invention, a doped lithium manganese spinel compound is mixed with lithium metal to produce a doped $Li_xMnO_2$ compound where $0.2 < x \leq 2$. The mixing of the spinel compound and lithium metal can be performed with or without a solvent. Mixing of the spinel compound and lithium metal can be performed using processes capable of energetically mixing the doped lithium manganese spinel compound and lithium metal, such as by high energy ball milling. The mixing preferably provides as much contact between the spinel compound and the lithium metal as possible. A doped lithium manganese spinel compound can include compounds such as those disclosed by U.S. Pat. No. 6,267,943 to Manev et al., which is incorporated in its entirety herein by reference. The lithium metal is preferably a stabilized lithium metal powder such as those disclosed by U.S. Pat. Nos. 5,567,474 and 5,776,369 to Dover et al., which are incorporated herein by reference in their entireties. One of the added advantages of the present invention is that the amount of lithium x in $Li_xMnO_2$, where $0.2 < x \leq 2$, can be easily controlled and varied by varying the amount of the lithium metal used in synthesis, unlike high temperature solid state synthesis where the x value is governed by the high temperature phase diagram and may not be changed at will.

In other embodiments of the present invention, a manganese dioxide such as a heat treated electrolytic manganese dioxide (EMD) compound can be mixed with a lithium metal to lithiate the manganese dioxide compound. The lithiated manganese dioxide such as the lithiated EMD material can be used as an electrode material in rechargeable lithium ion batteries. The lithium metal powder is preferably a stabilized lithium metal powder such as those disclosed by U.S. Pat. Nos. 5,567,474 and 5,776,369 to Dover et al.

Electrodes for use in batteries, and particularly for use with rechargeable lithium ion cell batteries, can be formed using the $Li_xMnO_2$ where $0.2<x\leq2$ compounds or lithiated EMD materials formed according to embodiments of the present invention.

The foregoing and other aspects of the present invention are explained in greater detail in the specification set forth below and will be apparent from the description of the invention and from the claims.

DETAILED DESCRIPTION OF THE INVENTION

Figure 1:
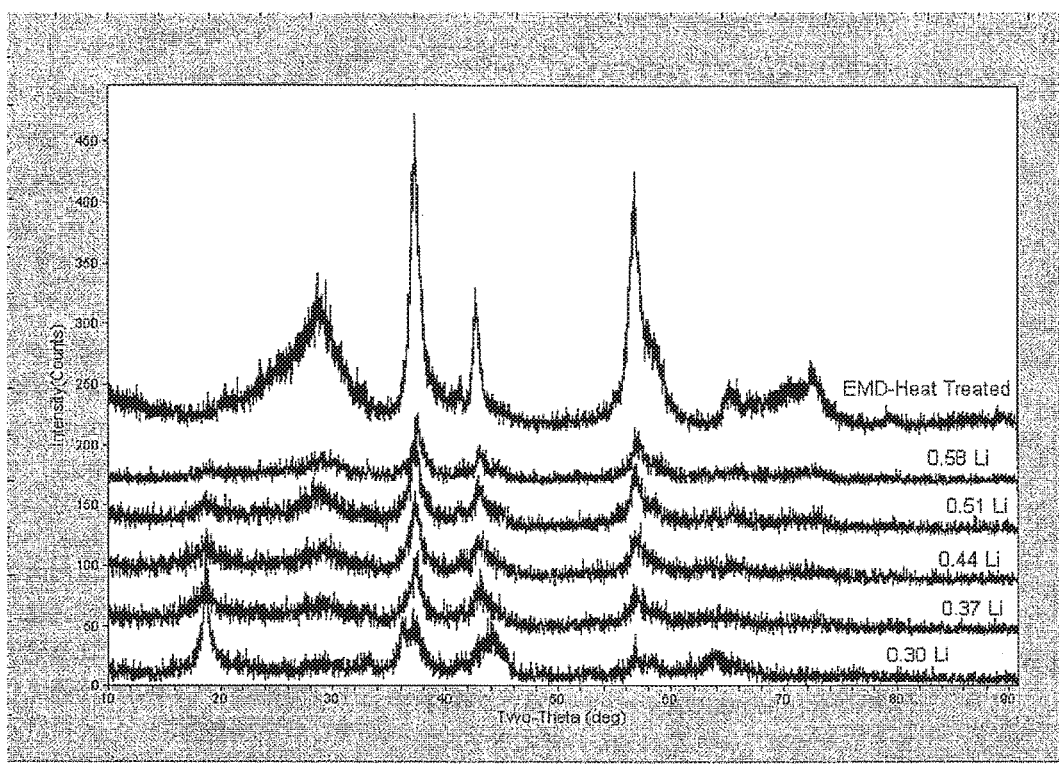
FIG. 1 is a graphic comparison of x-ray diffraction patterns according to Example 1.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Additionally, as used herein, the term "and/or" includes any and all combinations of one or more of the associated listed items.

Unless otherwise defined, all technical and scientific terms used herein have the same meaning as commonly understood by one of ordinary skill in the art to which this invention belongs.

All publications, U.S. patent applications, U.S. patents and other references cited herein are incorporated by reference in their entireties.

Embodiments of the present invention include methods for making lithium manganese oxide compounds and doped lithium manganese oxide compounds. The lithium manganese compounds and doped lithium manganese oxide compounds formed according to embodiments of the present invention can be used to form electrodes and electrode materials for use in batteries, such as rechargeable lithium ion batteries.

According to embodiments of the present invention, methods for forming a lithium manganese oxide compound having the formula $Li_xMnO_2$ where $0.2<x\leq2$ are provided. In some embodiments, the lithium manganese oxide compound can be a doped lithium manganese oxide compound. For example, a doped lithium manganese oxide compound having the formula $Li_2Mn_{1-\alpha}A_\alpha O_2$ can be formed, wherein A is a dopant and $0\leq\alpha\leq0.5$.

A lithium manganese oxide compound having the formula $Li_xMnO_2$ where $0.2<x\leq2$, often $0.5<x\leq2$ can be formed according to embodiments of the present invention by mixing an $LiMn_2O_4$ spinel compound with lithium metal. As the $LiMn_2O_4$ compound comes in contact with the lithium metal, the compound accepts the lithium and converts to the desired $Li_xMnO_2$ compound. For example, an $LiMn_2O_4$ compound can be mixed with lithium metal in a ball mill to form $Li_xMnO_2$. The lithium metal is preferably a stabilized lithium metal powder. The mixing of the $LiMn_2O_4$ compound can be performed using any mixing techniques, however, mixing that improves the amount of contact between the $LiMn_2O_4$ compound and the lithium metal is preferred.

The lithium metal in one embodiment, can be added all at once. In another embodiment, the lithium is added in smaller increments, e.g. x/4 or less. Such addition avoids distortion of the x-ray diffraction pattern, and allows the $Li_xMnO_2$ compound to maintain an x-ray diffraction (crystallinity) pattern similar to that of EMD.

The lithium metal used with embodiments of the present invention can include stabilized lithium metal powder ("SLMP"). For example, FMC Corporation produces a stabilized lithium metal powder under the name Lectro® Max Powder that may be used with embodiments of the present invention. Other lithium metal powders may also be used. For instance, U.S. Pat. No. 5,567,474 and U.S. Pat. No. 5,776,369, describe stabilized lithium metal powders and processes for making such powders that can be used with the embodiments of the present invention.

Stabilized lithium metal powders allow the methods of embodiments of the present invention to be performed with increased safety. However, lithium metal powders that are not stabilized can also be used with embodiments of the present invention. In those embodiments where non-stabilized lithium metal or lithium metal powders are used, additional processes can be employed to improve the safety of the reactions. For example, the mixing of an $LiMn_2O_4$ compound with the non-stabilized lithium metal or lithium metal powder can be performed in an inert atmosphere to inhibit undesired reactions of the lithium metal with the atmosphere.

In other embodiments of the present invention, a doped $Li_xMnO_2$ compound can be formed by mixing a doped $LiMn_2O_4$ compound with lithium metal. The doped $LiMn_2O_4$ compounds can include $LiMn_2O_4$ compounds doped with dopants such as cobalt (Co), nickel (Ni), magnesium (Mg), titanium (Ti), zirconium (Zr), chromium (Cr), or other dopants used in the production of electrode materials for use with batteries and rechargeable lithium-ion batteries. The lithium metal is preferably a stabilized lithium metal powder.

The mixing of lithium metal with $LiMn_2O_4$ or doped $LiMn_2O_4$ spinel compounds can be performed in a ball mill or according to other mixing techniques. In some embodiments, the mixing preferably includes energetic mixing which increases the mixing of the compounds, improving the amount of contact between the $LiMn_2O_4$ compounds and the lithium metal.

The mixing of lithium metal with $LiMn_2O_4$ can be performed with or without a solvent. If a solvent is used, the solvent is preferably compatible with lithium such that the lithium metal does not react with the solvent during the mixing. Solvents that can be used with embodiments of the present invention include, but are not limited to, acyclic and cyclic hydrocarbons, including n-hexane, n-heptane, cyclohexane, and the like; aromatic hydrocarbons such as toluene, xylene, isopropylbenzene (cumene), and the like; symmetrical, unsymmetrical, and cyclic ethers, including di-n-butyl ether, methyl t-butyl ether, tetrahydrofuran, and the like.

In some embodiments of the present invention, the $LiMn_2O_4$ compounds can be produced by calcining a mixture of at least one manganese oxide, at least one lithium compound, and optionally at least one dopant in a firing step at a temperature between 400° C. and 900° C. The manganese oxide compounds can include such compounds as $Mn_2O_3$, $Mn_3O_4$, electrolytic manganese dioxide, and β-$MnO_2$, and the firing step can include multiple firing steps.

In the calcining step, the mixture of source compounds is fired at between about 400° C. and about 900° C. Preferably, the mixture is calcined using more than one firing step at firing temperature with this temperature range. During calcinations, agglomeration of the spinel particles is preferably prevented. For example, during a multiple step firing sequence, agglomeration can be prevented by firing the source compounds in a fluid bed furnace or rotary calciner during at least a portion of the firing steps or by grinding the spinel material between steps.

The manganese oxide compounds produced in this manner can be formed into $LiMn_2O_4$ compounds that can be used with embodiments of the present invention. In addition, other methods for forming lithium manganese oxides may be used with embodiments of the present invention. For instance, the methods and compounds of U.S. Pat. Nos. 6,267,943; 6,423,294; and 6,517,803 may be used with embodiments of the present invention.

The lithiated EMD materials formed according to embodiments of the present invention exhibit a capacity of about 150 mA·hr/g to about 160 mA·hr/g when incorporated into an electrode. In addition, the lithiated EMD materials of the present invention can be made cheaply because EMD compounds are readily available and easily produced.

According to some embodiments of the present invention, the lithiated EMD materials of the present invention can be used as low cost materials for forming electrodes for use with lithium ion batteries.

Embodiments of the invention also include batteries and electrodes formed from compounds and materials produced according to embodiments of the present invention. An electrode for use with a lithium ion battery can be formed from the $Li_xMnO_2$ compounds or doped $Li_xMnO_2$ compounds formed according to embodiments of the present invention. In addition, the lithiated EMD materials formed according to embodiments of the present invention can be used to form electrodes for use in lithium ion batteries. The $Li_xMnO_2$ compounds and lithiated EMD materials formed according to embodiments of the present invention can be used to form anodes or cathodes for use in batteries and especially for use with rechargeable lithium ion batteries.

Having now described the invention, the same will be illustrated with reference to certain examples, which are included herein for illustration purposes only, and which are not intended to be limiting of the invention.

EXAMPLES

Example 1

Lithium is added into a heat treated electrolytic manganese dioxide ("HEMD"). Electrolytic manganese dioxide available for Erachem-Comilog was ground to reduce the particle size and heat treated at 400oC for 12 hours to obtained heat treated electrolytic manganese. The lithium is added in small increments of 0.075 moles of Li per one mole of manganese oxide. The addition is done in glove box at room temperature and stainless steel ball mill jar is used as a mixing vessel.

FIG. 1 shows the x-ray diffraction patters of HEMD with no lithium and the various total addition amounts (0.30 moles Li to 0.58 moles Li). Comparison of the x-ray diffraction patterns demonstrates that the lithium can be added incrementally without distorting the structure of the HEMD to maintain the HEMD-like structure.

Example 2 and Comparative Example 1

$Li_{0.3}MnO_2$ is prepared by two ways. In Comparative Example 1, all 0.3 moles of lithium to one mole manganese oxide are added at once. In Example 2, the lithium is added in increments of 0.075 moles lithium to one mole manganese oxide.

Figure 2:
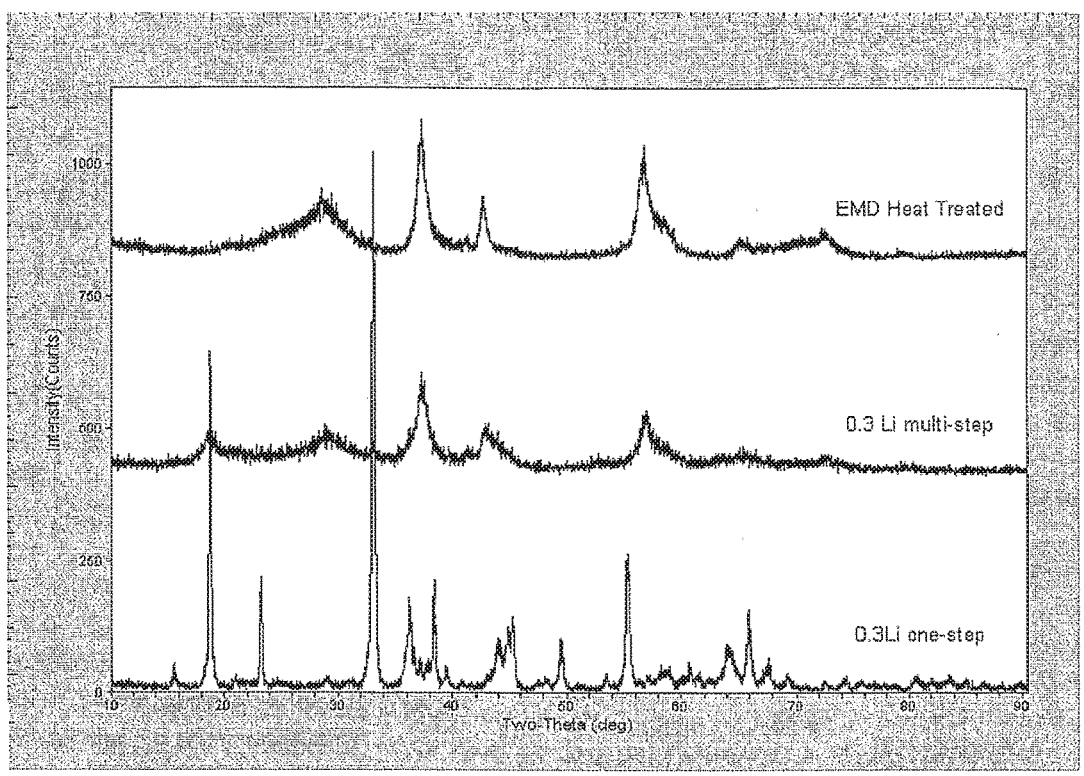
FIG. 2 is a graphic comparison of x-ray diffraction patterns according to Example 2 and Comparative Example 1.

The x-ray diffraction pattern of FIG. 2 shows a well crystalline spinel-like structure for the $Li_{0.3}MnO_2$ of Comparative Example 1. This is contrasted to the x-ray diffraction pattern for Example 2 which shows a pattern similar to that of the HEMD raw material sample and graphically indicates very little distortion therefrom.

Figure 3:
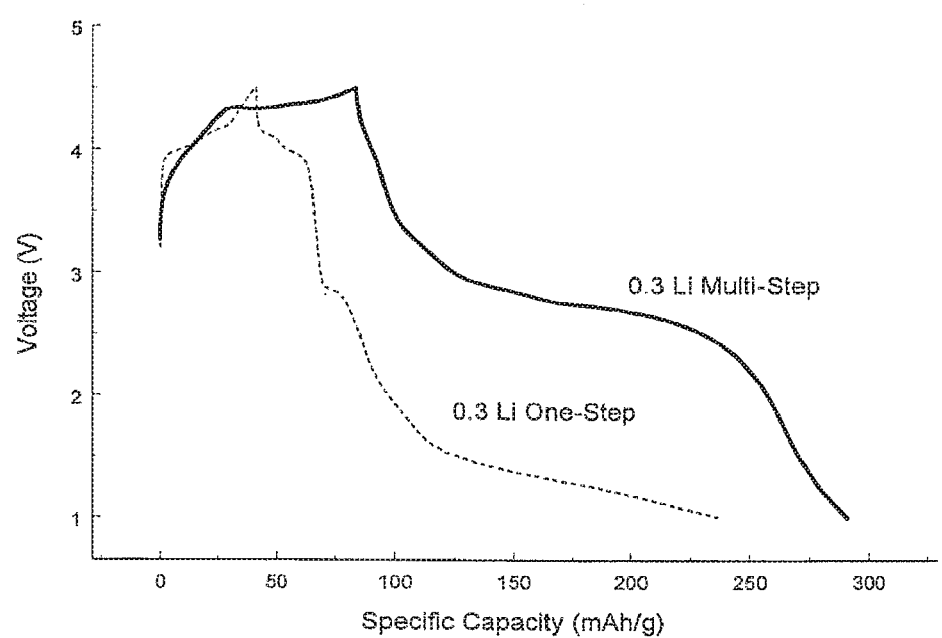
FIG. 3 is a graph of Voltage (V) versus Specific Capacity (mAH/g) relating to Example 2.

FIG. 3 shows electrochemical results. The $Li_{0.3}MnO_2$ of Example 2 shows an increase of first charge efficiency from 45 percent to 93 percent as compared to the one-step addition process of Comparative Example 1. The voltage profile was sustained for over 10 cycles which implies no structural changes occurred. Such sustaining of the voltage profile indicates such a material is a good candidate for 3V rechargeable lithium batteries.

Examples 3 and 4 and Comparative Example 2

$Li_{0.6}MnO_2$ is prepared by three ways. In Comparative Example 2, all of the 0.6 moles of lithium to one mole of manganese oxide are added at once. In Example 3, the 0.6 moles of lithium to one mole of manganese oxide are added in increments of 0.15 moles. In Example 4, the lithium is added in increments of 0.075 moles of lithium to one mole of manganese oxide.

Figure 4:
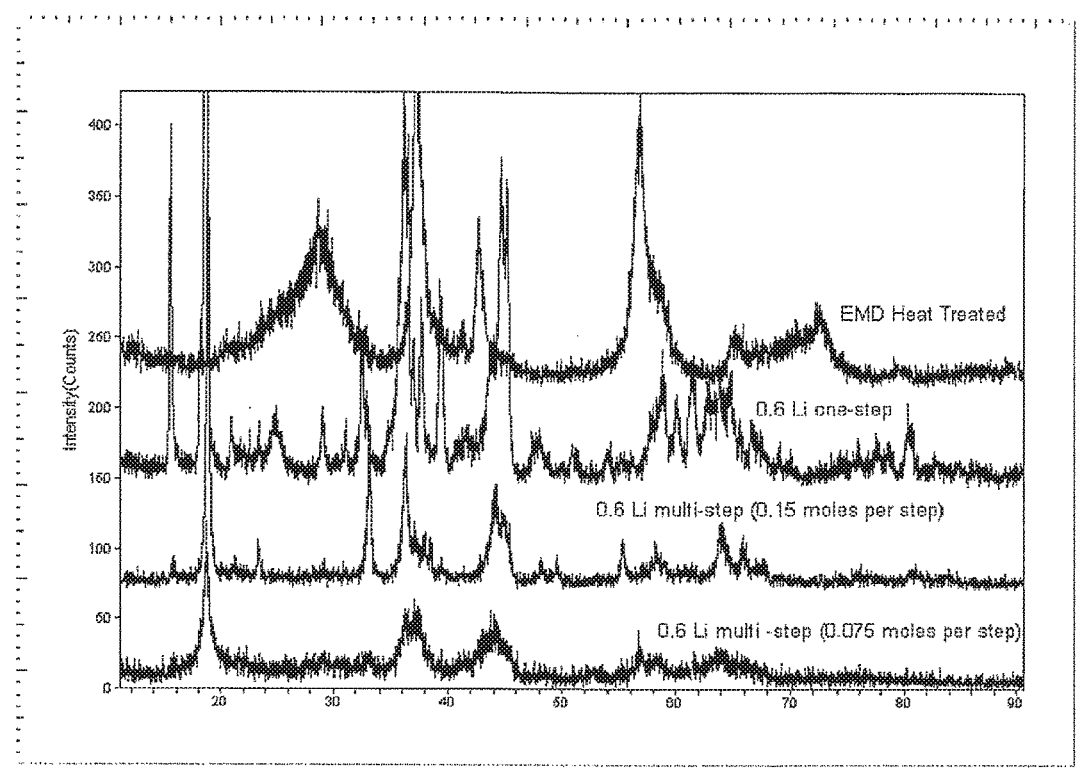
FIG. 4 is a graphic comparison of x-ray diffraction patterns according to Examples 3 and 4, and Comparative Example 1.

The x-ray diffraction pattern for Comparative Example 2 in FIG. 4 shows a well-crystalline spinel-like structure for the $Li_{0.6}MnO_2$ but is distorted as compared to the HEMD raw material sample. This is contrasted to Examples 3 and 4 which show patterns similar to that of the HEMD raw material sample and indicates very little distortion.

Figure 5:
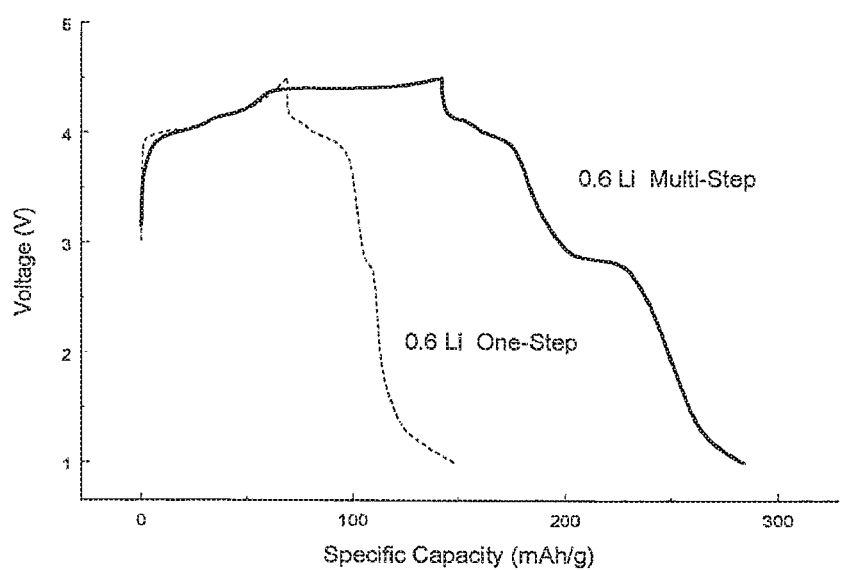
FIG. 5 is a graph of Voltage (V) versus Specific Capacity (mAH/g) relating to Example 3.

FIG. 5 shows electrochemical results. The $Li_{0.6}MnO_2$ of Example 3 shows an increase of first charge efficiency from 39 percent to 81 percent as compared to the one-step addition process of Comparative Example 2.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A method of forming a lithiated electrode material, comprising mixing an electrolytic manganese dioxide (EMD) compound with stabilized lithium metal powder by incrementally adding the stabilized lithium metal powder in x/4 or less increments to produce a lithiated electrolytic manganese dioxide material wherein distortion of the x-ray diffraction pattern is avoided and the crystalline structure of the EMD compound is maintained.

2. The method of claim 1, wherein the electrolytic manganese dioxide compound comprises a heat treated electrolytic manganese dioxide compound.

3. The method of claim 1, wherein mixing the electrolytic manganese dioxide compound with stabilized lithium metal powder comprises ball milling the electrolytic manganese dioxide compound with stabilized lithium metal powder wherein the lithium metal is incrementally added.

4. The method of claim 3, wherein ball milling the electrolytic manganese dioxide compound with stabilized lithium metal powder further comprises ball milling the electrolytic manganese dioxide compound with stabilized lithium metal powder in the presence of a solvent.

5. The method of claim 4, wherein the solvent is selected from the group consisting of acyclic hydrocarbons, cyclic hydrocarbons, aromatic hydrocarbons, symmetrical ethers, unsymmetrical ethers, and cyclic ethers.

6. The method of claim 4, wherein the electrolytic manganese compound is doped with a dopant selected from the group consisting of cobalt, nickel, titanium, zirconium, and chromium and any combinations thereof.

* * * * *